No. 738,804. PATENTED SEPT. 15, 1903.
W. A. HOLLAND.
TARGET TRAP.
APPLICATION FILED DEC. 16, 1902.
NO MODEL. 2 SHEETS—SHEET 1.
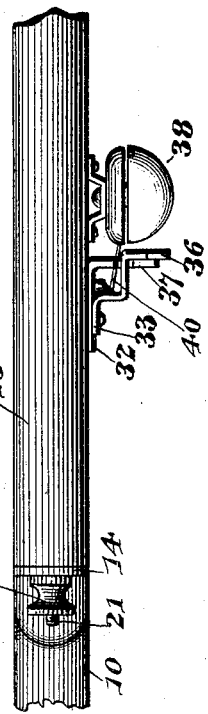
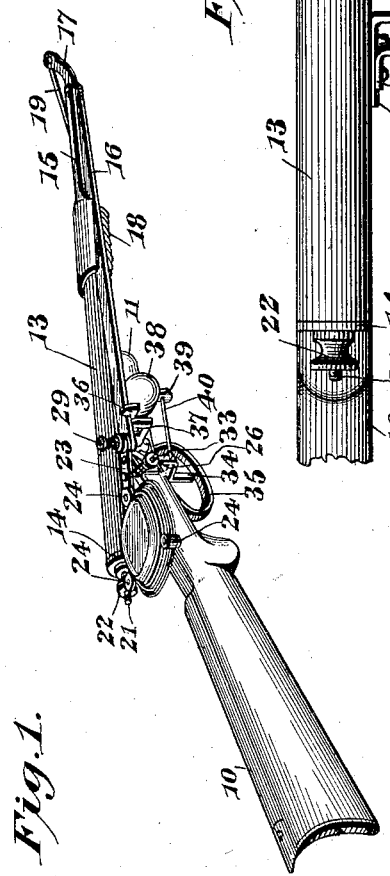
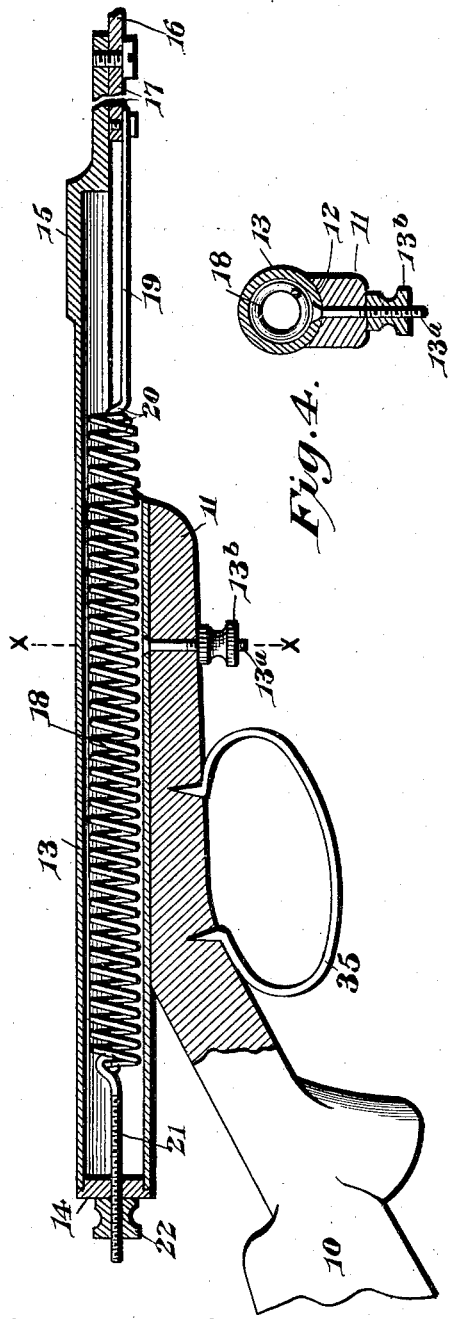
William A. Holland Inventor
Witnesses No. 738,804. PATENTED SEPT. 15, 1903.
W. A. HOLLAND.
TARGET TRAP.
APPLICATION FILED DEC. 16, 1902.
NO MODEL. 2 SHEETS—SHEET 2.
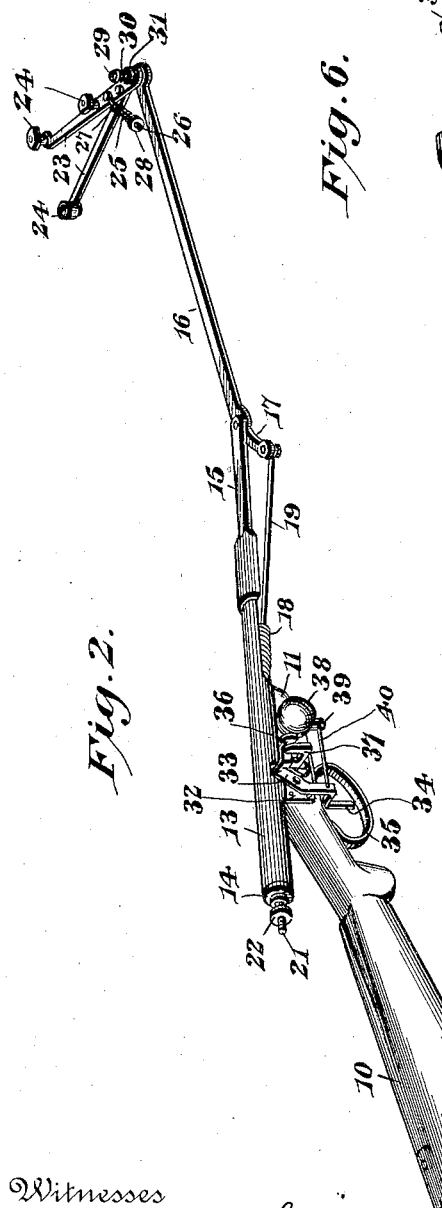
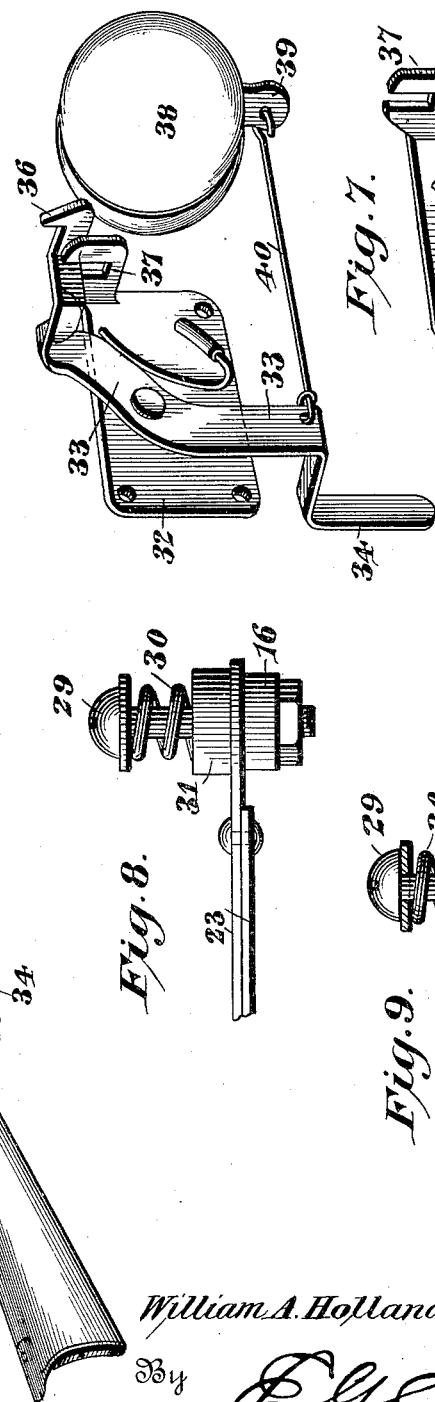
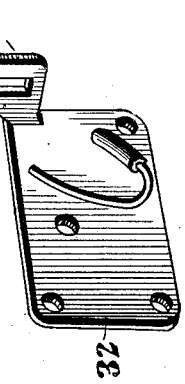
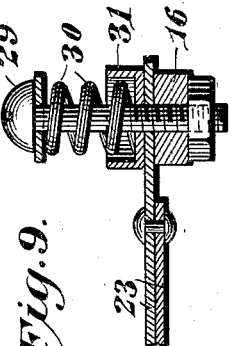
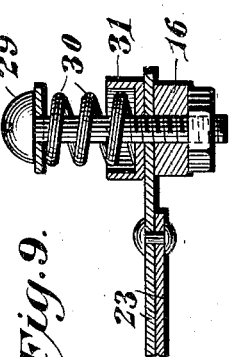
William A. Holland, Inventor No. 738,804.

Patented September 15, 1903.

UNITED STATES PATENT OFFICE.

WILLIAM ALBERT HOLLAND, OF LONDON, OHIO, ASSIGNOR OF ONE-HALF TO S. P. WILSON, OF LONDON, OHIO.

TARGET-TRAP.

SPECIFICATION forming part of Letters Patent No. 738,804, dated September 15, 1903.

Application filed December 16, 1902. Serial No. 135,432. (No model.)

*To all whom it may concern:*

Be it known that I, WILLIAM ALBERT HOLLAND, a citizen of the United States, residing at London, in the county of Madison and State of Ohio, have invented a new and useful Target-Trap, of which the following is a specification.

This invention relates to instruments employed in projecting flying targets, such as clay pigeons, and while relating particularly to that class arranged to be held in the hands there are certain features which may be employed in connection with those that are placed upon the ground.

One of the objects is to provide a structure wherein the elements located contiguous to the operator are housed, at the same time being simple and having all of the adjustments desirable in a trap of this character.

Another object is to provide simple and easily-constructed trigger mechanism which will securely hold the projecting means in set position and permit its release without danger to the operator.

Another very important feature resides in an alarm operated simultaneously with the release of the trap, thus giving suitable warning to the marksman.

The preferred embodiment of the invention is illustrated in the accompanying drawings, wherein—

Figure 1 is a perspective view of the trap when set. Fig. 2 is a similar view after the trap has been released or discharged. Fig. 3 is a longitudinal sectional view, on an enlarged scale, through the trap. Fig. 4 is a cross-section taken on the line $x\ x$ of Fig. 3. Fig. 5 is a top plan view of a portion of the trap. Fig. 6 is a detail perspective view of the trigger mechanism and the alarm. Fig. 7 is a detail perspective view of the base-plate and guide or keeper. Fig. 8 is a detail view of the pivot for the target-holder, and Fig. 9 is a sectional view through the same.

Similar reference-numerals indicate corresponding parts in all the figures of the drawings.

In the embodiment herewith illustrated a stock 10 is employed, which may be of any desired or well-known form having a framepiece 11, in the upper face or edge of which is arranged a concaved longitudinally-disposed seat 12. In this seat is fitted a tubular housing 13, that projects both in front and in rear of the frame portion, the rear end of the housing being closed by a plugged cap 14, the front end being open and cut away, as shown, to provide a forwardly-projecting finger 15. The housing is secured in place by means of a threaded stem $13^a$, which is secured thereto and extends through the frame 11 of the stock, being fastened by a thumb-nut $13^b$. A target-carrying arm 16 is pivoted between but contiguous to one of its ends to the front end of the finger 15, about which it can freely swing, the longer portion of this arm being so arranged that it can be brought back longitudinally of and at one side of the housing 13, the other or shorter end being offset, as shown at 17.

Actuating means in the form of a coiled spring 18 is located within the housing, projecting from the open end thereof. This spring is connected with the offset end 17 of the arm 16 by means of a link 19, pivoted to said offset end and having a hook 20, that engages the end of the spring. To the rear end of said spring is secured a threaded shank 21, that passes through the cap 14, above described, a tension-nut 22 being threaded on the projecting end and bearing against said cap. Target-holding means is secured to the free end of the arm 16 and may be of any desired construction, though preferably consisting of pivotally-connected fingers 23, having target-engaging studs 24, the arms being urged toward each other by a coiled spring 25, arranged upon a stem 26, that is attached to one of the fingers and extends through a lug 27 upon the other, the tension of this spring being regulable by means of a nut 28, threaded upon the same. One of the fingers is pivoted to the free end of the arm 16 by means of a bolt 29, about which is coiled a friction-spring 30, (shown more clearly in Figs. 8 and 9,) the inner end of this spring being seated in a cupped washer 31.

For the purpose of holding the arm 16 in set position trigger mechanism is employed, which is illustrated in great detail in Fig. 6. A base-plate 32 is secured to one of the side faces of the stock, and to the same is pivoted a lever 33, one arm of this lever extending downwardly and being offset, so that its lower terminal is located directly beneath the stock, forming a finger-trigger 34, surrounded by the usual guard 35. The upper arm of this lever is also offset, and the terminal is in the form of a hook 36, adapted to engage the arm 16, and thus hold the same from being swung about by the coiled spring 18. As this holding action will impart considerable strain to the hook-arm, a guide or keeper 37 is employed, which embraces said arm and prevents its lateral displacement, said keeper projecting from the base-plate 32.

For the purpose of notifying the marksman of the projection of the target an alarm is employed, which is operable simultaneously with the release of the projecting means. This alarm is shown in the form of a bell 38, attached to the side of the stock-frame 11. The bell may be of any desired construction, being provided with a projecting handle 39, which is connected to the lower arm of the lever 33 by a link 40.

The manner of operating this device will be readily understood by those skilled in the art. The target is first secured in the holder, and the arm is swung about and locked by the trigger mechanism. This elongates the actuating-spring, and thus when the trigger is pulled and the arm released the said arm will swing upon its pivot with considerable force. As it reaches its foremost position it will stop; but the momentum imparted to the target will cause the same to spread the holding-fingers apart, and it will thus be released. The force of the spring can be regulated by adjusting the tension-nut 22, and in like manner the resistance to the swinging of the fingers is also regulable by tightening the bolt 29 and the nut 28. When the trigger is pulled to release the target-carrying arm, it will be evident that the bell will also be operated, and thus a signal is given to the marksman of the approaching projection of the target. The advantages for this structure are many. In the first place the spring contiguous to the operator is completely inclosed, and any danger of injury from this source is thereby avoided. The offsetting of the end 17 of the arm that is connected with the spring is also an important feature, as it throws said connection a considerable distance off a dead-center or line with the pivot when the arm is swung back, and the spring can act with greater force, as will be clearly understood. The trigger mechanism is of a very simple character and can be easily manufactured. At the same time it is thoroughly practicable and is not liable to become deranged. The advantages for the alarm will be obvious to those skilled in the art. The trap can be readily dismembered and packed within a small compass either for transportation or storage.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim, and desire to secure by Letters Patent, is—

1. In a trap of the class described, the combination with a stock, of a tubular housing mounted on the stock and having a continuous inclosing wall, a swinging target-carrying arm pivoted to the housing, and an actuating-spring connected to the arm and arranged longitudinally within the housing, said housing completely surrounding a portion of the spring.

2. In a trap of the class described, the combination with a grip-stock, of a tubular housing mounted on the stock and having a continuous inclosing wall, a swinging target-carrying arm pivoted upon the front end of the housing, a coiled actuating-spring connected at its front end with the arm and arranged longitudinally within the housing, the rear end of said housing completely inclosing the adjacent portion of the spring, and means located at the rear end of the barrel for regulating the tension of the spring.

3. In a trap of the class described, the combination with a stock, of a housing arranged thereon, a swinging target-carrying arm, an actuating-spring connected to the arm and arranged in the housing, a cap closing the rear end of the housing, a threaded shank connected to the spring and passing through the cap, and a regulating-nut screwed on the shank and bearing against the cap.

4. In a trap of the class described, the combination with a grip-stock, of a tubular housing secured thereto, a finger carried by the housing and projecting from its outer end, a coiled spring having its rear portion located longitudinally within and completely inclosed by the housing, and a target-carrying arm pivoted to the finger and connected with the front end of the spring.

5. In a trap of the class described, the combination with a grip-stock, of a tubular housing secured thereto, said housing having a continuous annular wall at its rear portion and its front portion cut away to form a forwardly-projecting finger, a coiled spring located longitudinally within the housing, an adjustable connection between the rear end of the housing and the rear end of the spring, a target-carrying arm pivoted to the finger, and a connection between the arm and the front end of the spring.

6. In a trap of the class described, the combination with a stock, of a continuously-walled cylindrical housing mounted thereon, said housing having its front end open and its rear end closed, a finger projecting beyond the open end, a target-carrying arm pivoted between its ends to the front end of the finger, an actuating-spring located longitudinally within the housing and having its rear end completely inclosed thereby, a link connecting the front end of the spring and one end of the arm, and a shank secured to the rear inclosed end of the spring and passing through the closed end of the housing.

7. In a trap of the class described, the combination with target-projecting means, of a manual supporting-stock for the same, a stem secured to the projecting means and detachably passing through the stock to secure said projecting means to said stock, and means for holding the projecting means and stock against relative swinging movement on the stem as an axis.

8. In a trap of the class described, the combination with a manually-supporting stock having a seat in its upper face, of target-projecting means including a tubular housing that rests in the seat, and a stem secured to the housing and extending through the stock, being detachably secured thereto, and holding the projecting means against movement on the stock.

9. In a trap of the class described, the combination with a grip-stock, of a tubular housing secured thereto and having an open front end, said end having a cut-away portion to provide a forwardly-extending finger, a target-carrying arm pivoted between its ends to the front end of the finger, a target-holder located on one end of the arm, the other end of said arm being movable through the cut-away portion of the housing, and a spring located longitudinally within the housing, said spring being attached at its rear end and having a connection with the last-mentioned end of the target-carrying arm.

10. In a trap of the class described, the combination with a suitable hand-support, of a swinging target-carrying arm pivoted upon the support, and a single rigid locking-lever for the arm pivoted between its ends upon the support, one arm of said lever constituting a depending finger-trigger and being movable longitudinally of the support, the other arm detachably engaging the target-carrying arm.

11. In a trap of the class described, the combination with a suitable stock, of target-projecting means arranged on the stock and including a swinging target-carrying arm, and a single rigid locking-lever for the arm pivoted between its ends upon the stock, one arm of said lever being arranged in depending relation below the stock and constituting a finger-trigger that is movable longitudinally of the stock, the other arm being in the form of an outstanding hook that is disposed at one side of the stock and detachably engages the target-carrying arm.

12. In a trap of the class described, the combination with a suitable stock, of target-projecting means arranged on the stock and including a swinging target-carrying arm, a locking-lever for the arm pivoted between its ends upon the stock, one arm of said lever being in depending relation below the stock and constituting a finger-trigger, the other arm being in the form of a hook at one side of the stock to engage the target-carrying arm, and a keeper engaging the hook-arm to hold it against lateral displacement.

13. In a trap of the class described, the combination with a grip-stock, of target-projecting means on the stock and including a swinging target-carrying arm, a plate secured to the side of the stock, a locking-lever pivoted between its ends upon the plate, the lower arm of the lever being inturned and depending below the stock forming a trigger, a hook on the other arm of the lever and engaging the target-carrying arm, and a guide or keeper secured to the base-plate and embracing the hook-arm to prevent the lateral displacement of the same.

14. In a trap of the class described, the combination with target-projecting means, of a releasing-trigger associated with the projecting means, and an alarm positively connected with the trigger and actuated by the movement of said trigger.

15. In a trap of the class described, the combination with target-projecting means, including a swinging arm, of a pivoted trigger for holding the arm in said position, and an alarm-bell having a direct positive connection with the trigger and operated by said trigger.

16. In a trap of the class described, the combination with a grip-stock, of target-projecting means arranged on the stock, a trigger pivoted upon the stock and arranged to engage the projecting means, an alarm-bell secured to the stock having a handle, and a link connecting the handle of the bell to the trigger so that said bell is rung by the movement of the trigger.

In testimony that I claim the foregoing as my own I have hereto affixed my signature in the presence of two witnesses.

WILLIAM ALBERT HOLLAND.

Witnesses:
C. M. THOMPSON,
C. B. STRAM.